United States Patent
Rusch et al.

(10) Patent No.: US 10,473,114 B2
(45) Date of Patent: Nov. 12, 2019

(54) COMPRESSOR ASSEMBLY FOR A TURBOCHARGER

(71) Applicant: ABB Turbo Systems AG, Baden (CH)

(72) Inventors: Daniel Rusch, Wettingen (CH); Gerd Mundinger, Wettingen (CH)

(73) Assignee: ABB Turbo Systems AG, Baden (CH)

( * ) Notice: Subject to any disclaimer, the term of this patent is extended or adjusted under 35 U.S.C. 154(b) by 0 days.

(21) Appl. No.: 15/570,356

(22) PCT Filed: Apr. 27, 2016

(86) PCT No.: PCT/EP2016/059390
§ 371 (c)(1),
(2) Date: Oct. 29, 2017

(87) PCT Pub. No.: WO2016/174078
PCT Pub. Date: Nov. 3, 2016

(65) Prior Publication Data
US 2018/0142699 A1    May 24, 2018

(30) Foreign Application Priority Data
Apr. 29, 2015   (DE) .................. 10 2015 106 596

(51) Int. Cl.
*F04D 29/44* (2006.01)
*F04D 27/02* (2006.01)
(Continued)

(52) U.S. Cl.
CPC .......... *F04D 29/441* (2013.01); *F02B 37/10* (2013.01); *F04D 17/10* (2013.01);
(Continued)

(58) Field of Classification Search
CPC .............. F04D 29/441; F04D 27/0238; F04D 29/4206; F04D 17/10; F02B 37/10;
(Continued)

(56) References Cited

U.S. PATENT DOCUMENTS 3,226,940 A * 1/1966 Jekat ..................... F04D 17/127
                                                      415/109
4,250,711 A * 2/1981 Zehnder .................. F02B 37/00
                                                       60/278
(Continued)

FOREIGN PATENT DOCUMENTS

DE   1922386 A1   11/1970
DE   3128040 A1    2/1983
(Continued)

OTHER PUBLICATIONS

European Patent Office, International Search Report for PCT/EP2016/059390, dated Aug. 3, 2016, 5 pages (including translation).
(Continued)

*Primary Examiner* — Hoang M Nguyen
(74) *Attorney, Agent, or Firm* — Barnes & Thornburg LLP

(57) ABSTRACT

The present invention relates to a compressor assembly for a turbocharger. The compressor assembly may comprise a spiral housing with a flow channel which is designed to convey a fluid which can be sucked up from outside the compressor assembly, a compressor outlet flange which is fluidically connected to the spiral housing via the flow channel, and an injection device designed to introduce a fluid from outside the compressor assembly into the flow channel, wherein the injection device is arranged outside the flow channel of the spiral housing.

16 Claims, 3 Drawing Sheets

(51) Int. Cl.
*F04D 17/10* (2006.01)
*F02B 37/10* (2006.01)
*F02C 6/12* (2006.01)
*F04D 29/42* (2006.01)

(52) U.S. Cl.
CPC ..... *F04D 27/0238* (2013.01); *F04D 29/4206* (2013.01); *F02C 6/12* (2013.01); *F05B 2220/40* (2013.01); *F05D 2220/40* (2013.01); *F05D 2250/52* (2013.01); *Y02T 10/144* (2013.01)

(58) Field of Classification Search
CPC ...... Y02T 10/144; F05B 2220/40; F02C 6/12; F05D 2220/40; F05D 2250/52
USPC .................................................. 60/605.1–612
See application file for complete search history.

(56) References Cited

U.S. PATENT DOCUMENTS

2005/0193732 A1\* 9/2005 LaRue ................. F01D 25/125
60/605.1
2006/0130479 A1\* 6/2006 Holm ..................... F02B 37/00
60/602

FOREIGN PATENT DOCUMENTS

DE 3529543 A1 2/1987
JP S55180930 U 12/1980
WO 2014106252 A1 7/2014

OTHER PUBLICATIONS

European Patent Office, Written Opinion of ISA for PCT/EP2016/059390, dated Aug. 3, 2016, 6 pages.
European Patent Office, International Preliminary Report on Patentability for PCT/EP2016/059390, with annexes, dated Aug. 23, 2017, 15 pages (including translation of Article 34 amendment only).

\* cited by examiner

COMPRESSOR ASSEMBLY FOR A TURBOCHARGER

CROSS-REFERENCE TO RELATED APPLICATIONS

This application is a U.S. National Stage Application under 35 U.S.C. § 371 of International Patent Application No. PCT/EP2016/059390, filed Apr. 27, 2016, which claims priority to German Application No. 102015106596.7, filed on Apr. 29, 2015, the contents of each of which are hereby incorporated by reference in their entirety.

TECHNICAL FIELD OF THE INVENTION

The present invention relates to a compressor assembly. In addition, the scope of the present invention also extends to compressors having a purely radial or diagonal outflow from the compressor impeller. Furthermore, the present invention relates to a turbocharger with a compressor assembly.

PRIOR ART

In order to improve the load response behavior in the case of turbocharged internal combustion engines, air injection systems are used in and downstream of the turbocharger compressor. Such a known air injection system consists of what are referred to as auxiliary air drives. Compressed air is injected here in the impeller region of the compressor and in the direction of rotation. As a result, the compressor rotor blades are driven and the rotational speed of the turbocharger and also the mass flow and the charging pressure ratio increase. Another known air injection system is known under the name direct air injection system (DAI system). In this case, compressed air is injected coaxially into the pipe downstream of the compressor outlet flange via what is referred to as a lance. The system operates here in the manner of a jet pump, that is to say, it reduces the compressor outlet pressure, and therefore the turbocharger rapidly reaches a higher speed of rotation. At the same time, the mass flow through the engine is thus increased, which permits a more rapid load response. DAI systems which are known from the prior art and have an air injection device are generally designed in such a manner that a nozzle projects into the flow channel of the diffuser in or downstream of the turbocharger compressor. Other known DAI systems provide the use of what are referred to as annular chamber arrangements in the flow channel. However, this has the following disadvantages: firstly, flow losses may occur during operation because of the nozzle projecting into the flow channel. Also, because of the flow in the flow channel, the risk of breakage of a nozzle increases when the nozzle projects into the flow channel. When an annular chamber arrangement is used in the flow channel, an additional component is required, which causes additional costs.

SUMMARY OF THE INVENTION

The present invention is based on the objective technical object of developing a compressor assembly with an injection system in such a manner that optimized injection of fluid into the flow channel of the compressor assembly is ensured and at the same time flow losses in the flow channel of the compressor assembly are reduced.

In addition, it is a further object to improve the load response behavior of turbocharged internal combustion engines.

The object is achieved by a compressor assembly which comprises a spiral housing with a flow channel which is designed to convey a first fluid which can be sucked up from outside the compressor assembly. The compressor assembly furthermore comprises a compressor outlet flange which is fluidically connected to the spiral housing via the flow channel, and an injection device, wherein the injection device is designed to introduce a second fluid from outside the compressor assembly into the flow channel, wherein the injection device is arranged outside the flow channel of the spiral housing.

By means of the arrangement of the injection device outside the flow channel of the spiral housing, the following advantages arise: The second fluid injected by the injection device into the flow channel of the compressor assembly, and in particular in the flow channel of the diffuser of the compressor assembly, has a positive influence on the main flow in the flow channel, that is to say, the injected second fluid interacts with the first fluid of the main flow in the flow channel and supports or reinforces a swirl flow or spiral flow of the main flow. This advantageously leads to a reduction in pressure in the diffuser of the compressor assembly.

A further advantage consists in that a nozzle for injecting fluid into the flow channel of the compressor assembly can be realized without additional components. In addition, the injection device according to the invention, which can be realized with lower additional costs, does not impair the flow in the flow channel, which leads to greater efficiency during operation of the compressor assembly.

EMBODIMENTS OF THE INVENTION

In one embodiment of the present invention, the injection device is at least partially incorporated in the spiral housing. The injection device comprises at least one opening to the flow channel so that fluid can be introduced from outside the compressor assembly into the flow channel by the injection device.

In a preferred embodiment of the present invention, the injection device comprises a fluid channel.

In a preferred embodiment of the present invention, the injection device is attached to an outer wall of the spiral housing so that a fluid can be introduced from outside the compressor assembly via the injection device into the flow channel through an opening of the spiral housing.

In a preferred embodiment of the present invention, the outer wall of the spiral housing, to which outer wall the injection device is attached, forms part of an outer wall of the diffuser.

In a preferred embodiment of the present invention, the compressor outlet flange at least partially comprises an injection device so that fluid can be introduced from outside the compressor assembly into the flow channel of the spiral housing by the injection device.

In a preferred embodiment of the present invention, the injection device comprises a fluid channel in the compressor outlet flange, wherein the fluid channel comprises a first opening and a second opening, wherein a fluid can be introduced from outside the compressor assembly into the fluid channel via the first opening of the fluid channel, and wherein the second opening of the fluid channel fluidically connects the fluid channel to the flow channel of the spiral housing so that the introduced fluid can be introduced into the flow channel.

In a preferred embodiment of the present invention, a portion of the fluid channel is formed by a connection piece which is connectable to the compressor outlet flange.

In a preferred embodiment of the present invention, the injection device comprises a reservoir for storing the fluid and for the uniform distribution of the fluid over the circumference of the flow channel, wherein the reservoir comprises part of the fluid channel.

In a preferred embodiment of the present invention, the injection device comprises a connection element so that fluid can be introduced from outside the compressor assembly into the injection device via an injection element which is insertable into the connection element and is designed a as a nozzle.

In a preferred embodiment of the present invention, the injection device is of nozzle-shaped design.

In a preferred embodiment of the present invention, the compressor assembly comprises a diffuser, wherein the diffuser is fluidically connected to the spiral housing via the flow channel.

In a preferred embodiment of the present invention, the diffuser is designed as a conical diffuser.

In a preferred embodiment of the present invention, the diffuser is fluidically connected to the compressor outlet flange via the flow channel.

In a preferred embodiment of the present invention, a turbocharger comprises a compressor assembly.

BRIEF DESCRIPTION OF THE DRAWINGS

The invention is described below with reference to exemplary embodiments which are explained in more detail with reference to drawings, in which.

In the description below, identical reference signs are used for parts which are identical and act in an identical manner.

DETAILED DESCRIPTION OF THE DRAWINGS

Figure 4:
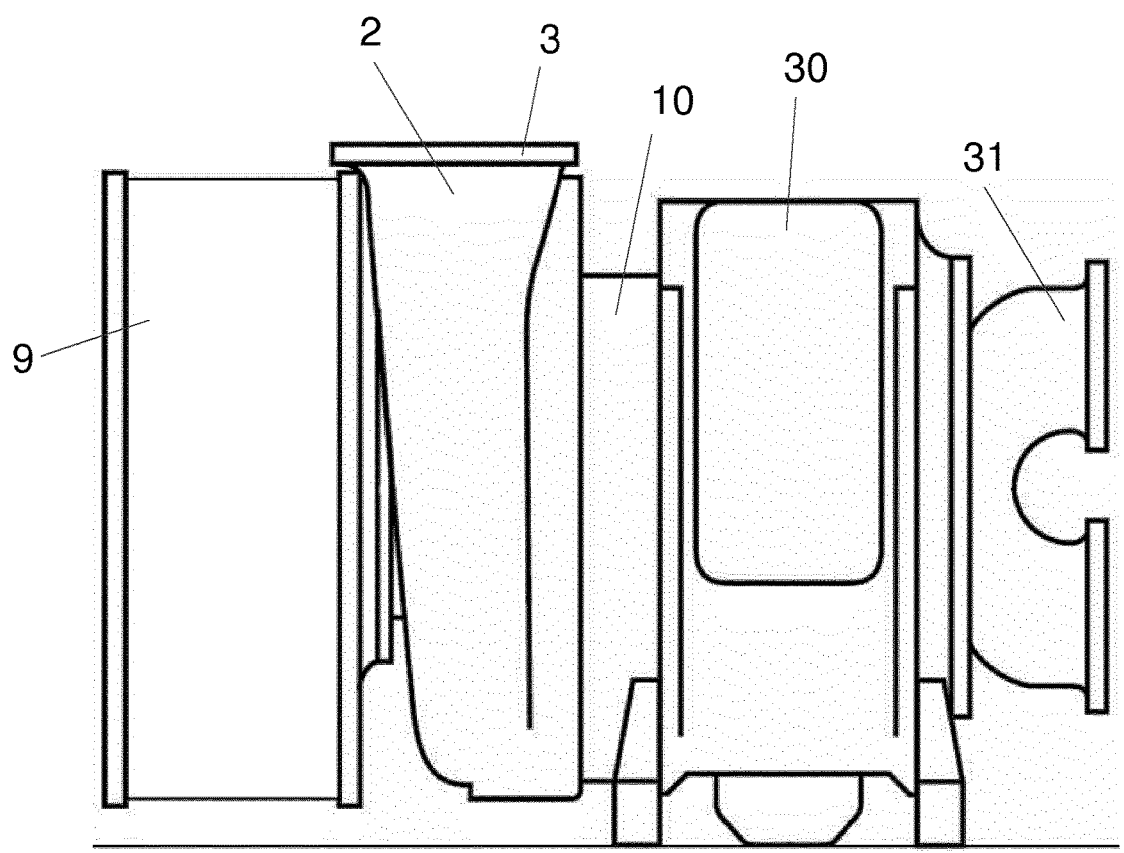
FIG. 4 shows an exterior view of an exhaust gas turbocharger with a filter sound absorber, compressor outlet housing (spiral housing), a bearing housing, a gas outlet housing and a gas inlet housing.

FIG. 4 shows an exhaust gas turbocharger with an axial turbine and a radial compressor. The housing parts which can be seen in the exterior view are as follows, from left to right: the filter sound absorber 9 is located on the air inlet side of the compressor. The air sucked up via the filter sound absorber is guided through a central opening in the filter sound absorber into the adjacent compressor housing having the spiral housing 2. Indicated at the upper edge of the spiral housing is the compressor outlet flange 3 which is provided for the fastening of a pipe with which the compressed air is fed to an internal combustion engine. The compressor is driven via an exhaust gas turbocharger shaft which is mounted rotatably in the bearing housing 10. The shaft is driven by a turbine wheel which is arranged in the turbine housing. The turbine housing comprises a gas outlet housing 30 and a gas inlet housing 31 which, in the embodiment illustrated, is designed with two pipes.

Figure 1:
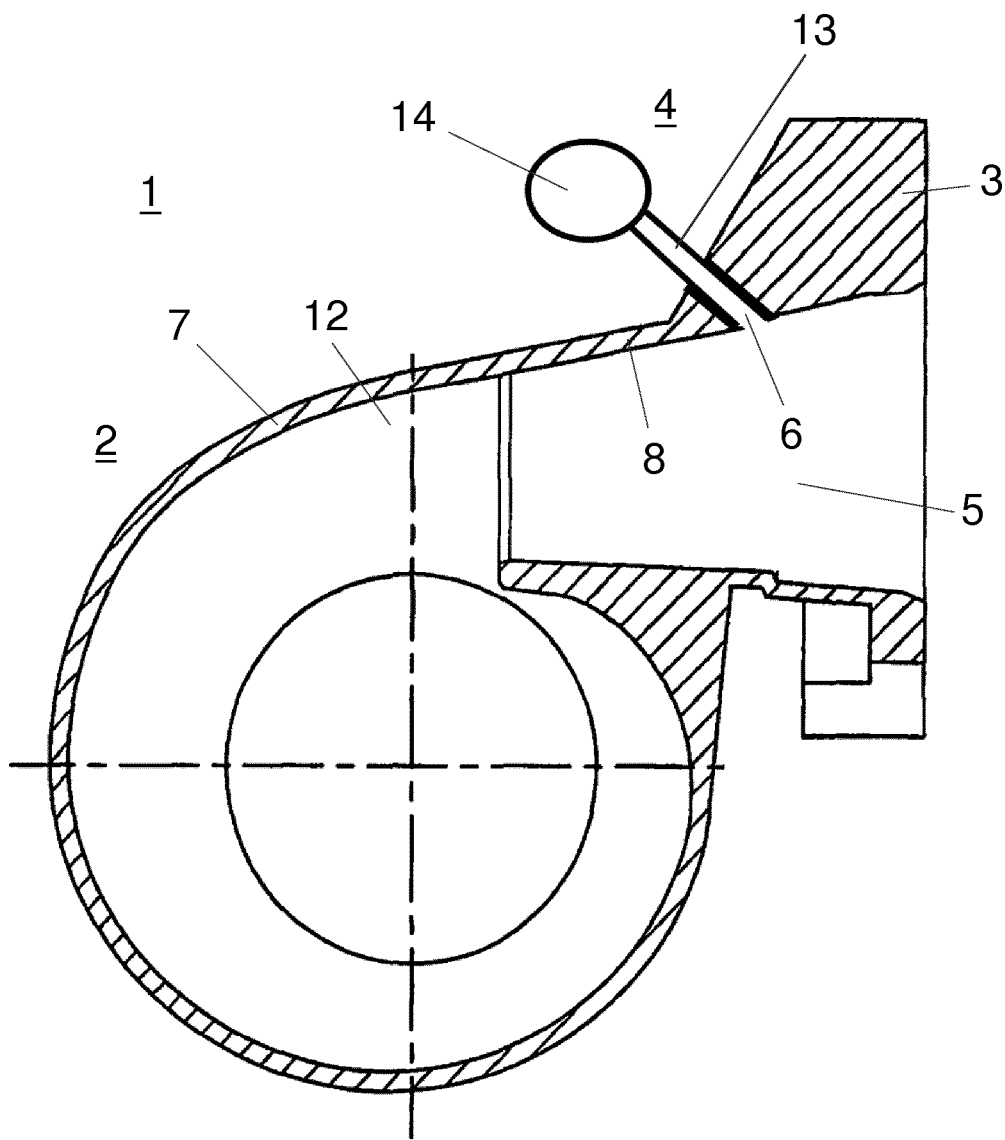
FIG. 1 shows a compressor assembly with an injection device in a sectional view according to a first embodiment of the present invention.

FIG. 1 shows, in a section perpendicular to the shaft axis of the exhaust gas turbocharger through the spiral housing of a compressor assembly. The compressor assembly 1 comprises the spiral housing 2 with a flow channel 12, wherein the flow channel 12 is designed to convey a first fluid, such as, for example, air, which can be sucked up from outside the compressor assembly 1. The compressor assembly 1 furthermore comprises a compressor outlet flange 3 which is fluidically connected to the spiral housing 2 via the flow channel 12. The compressor assembly 1 furthermore comprises a diffuser 5. The diffuser 5 is fluidically connected to the compressor outlet flange 3 via the flow channel 12. However, the diffuser 5 is also fluidically connected to the spiral housing 2 via the flow channel 12. The diffuser can also be designed here as a conical diffuser. The injection device 4 is designed to introduce a second fluid from outside the compressor assembly 1 into the flow channel 12. The injection device 4 is arranged outside the flow channel 12 of the spiral housing 2 in FIG. 1. The injection device 4 comprises a connection element 14 for the supply of a second fluid, and a fluid channel 13 through which the second fluid which can be introduced from outside the compressor assembly 1 flows. The fluid channel 13 is connected to the flow channel 12 via an opening 6 in the spiral housing. The second fluid which is injected via the fluid channel 13 therefore interacts with the first fluid in the flow channel 12 and can reinforce the swirl flow of the first fluid in the flow channel 12. In FIG. 1, the injection device 4 is partially incorporated into the spiral housing 2. In detail, the injection device 4 in FIG. 1 is attached to an outer wall 7 of the spiral housing 2 so that a second fluid can flow from outside the compressor assembly 1 via the injection device 4 into the flow channel 12 through the opening 6 in the spiral housing 2. In FIG. 1, the outer wall 7 of the spiral housing 2, to which outer wall the injection device 4 is attached, forms part of an outer wall 8 of the diffuser 5. The compressor assembly according to the embodiment of FIG. 1 can be part of a turbocharger (not illustrated).

Figure 2:
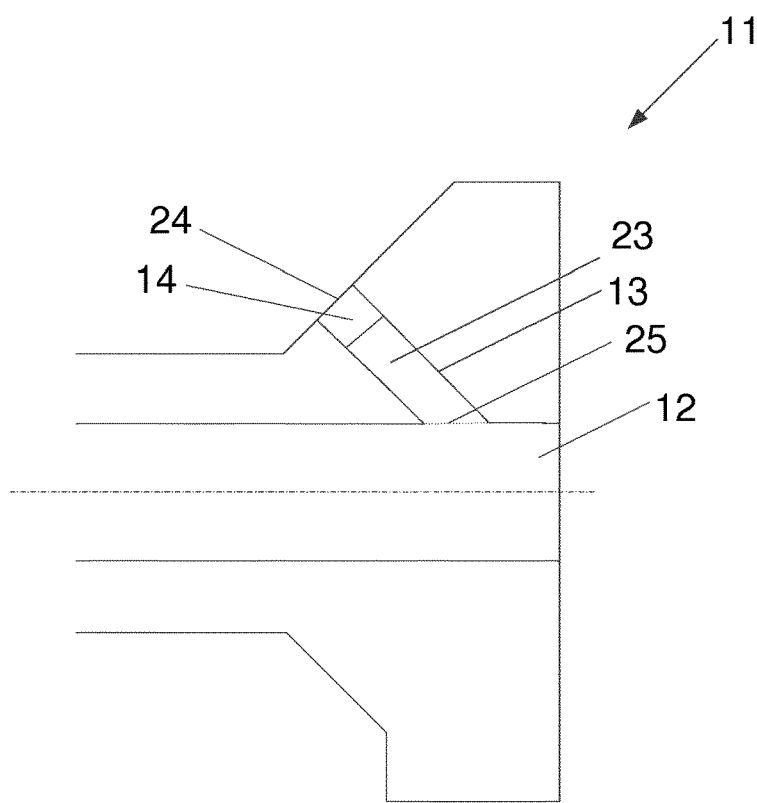
FIG. 2 shows a cutout of a compressor outlet flange with an integrated injection device according to a second embodiment of the present invention.

FIG. 2 shows a cutout of a compressor outlet flange 11 with an injection device 13 integrated in the compressor outlet flange 11. Alternatively, the injection device 13 can also be incorporated only partially (not illustrated) into the compressor outlet flange 11 so that a second fluid can be introduced from outside the compressor assembly 1 into the flow channel 12 of the spiral housing 2 by the injection device 13. The injection device 13 comprises a fluid channel 23 in the compressor outlet flange 11, wherein the fluid channel 23 comprises a first opening 24 and a second opening 25, wherein a second fluid can be introduced from outside the compressor assembly 1 into the fluid channel 23 via the first opening 24 of the fluid channel 23, and wherein the second opening 25 of the fluid channel 23 fluidically connects the fluid channel 23 to the flow channel 12 of the spiral housing 2 so that the introduced second fluid can be introduced into the flow channel 12. In FIG. 2, the injection device 13 comprises a connection element 14. An injection element designed as a nozzle can be inserted into the injection device 4 in the connection element 14 so that the second fluid can be introduced from outside the compressor assembly 1 into the injection device 4. The injection device 13 can be of nozzle-shaped design here.

Figure 3:
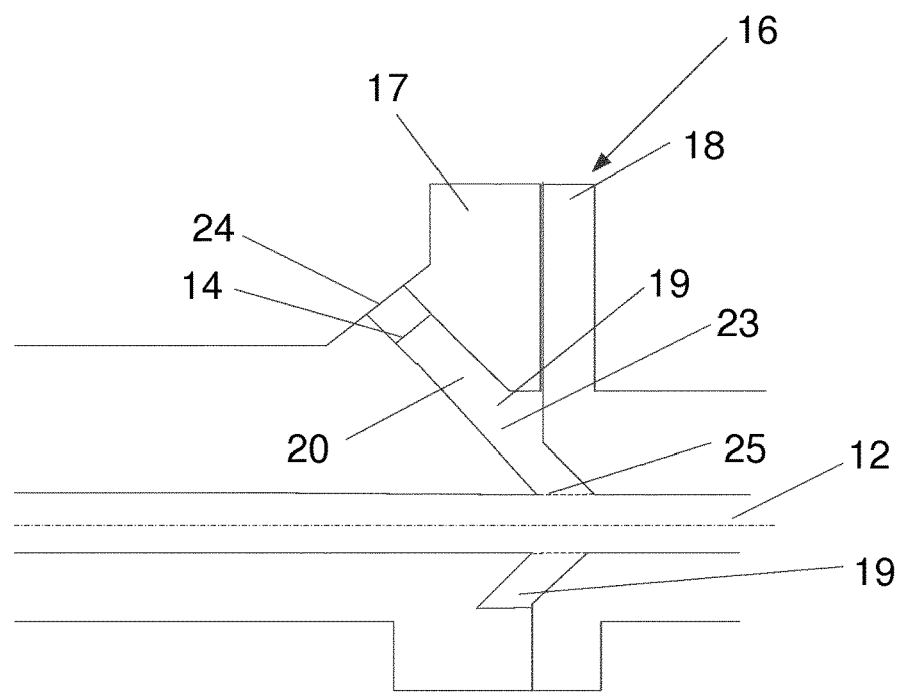
FIG. 3 shows a cutout of a compressor outlet flange with an injection device according to a third embodiment of the present invention.

FIG. 3 shows a cutout of a compressor outlet flange 16 with an injection device 20 of a compressor assembly 1. The injection device 20 comprises a fluid channel 23 in the compressor outlet flange 17, wherein the fluid channel 23 comprises a first opening 24 and a second opening 25, wherein a second fluid can be introduced from outside the compressor assembly 1 into the fluid channel 23 via the first opening 24 of the fluid channel 23, and wherein the second opening 25 of the fluid channel 23 fluidically connects the fluid channel 23 to the flow channel 12 of the spiral housing 2 so that the introduced second fluid can be introduced into the flow channel 12. In contrast to FIG. 2, in the embodiment of FIG. 3, a portion of the fluid channel 23 is formed by a connection piece 18 which is connectable to the compressor outlet flange 16. This connection piece 18 can be configured here on the engine side. Also in FIG. 3, the injection device 20 comprises a connection element 14. Furthermore, the injection device 20 comprises a reservoir 19 for storing the second fluid and for the uniform distribution of the fluid over the circumference of the flow channel 12, wherein the reservoir 19 comprises part of the fluid channel 23. Also in the embodiment of FIG. 3, the injection device 20 can be of nozzle-shaped design.

In the embodiments of FIGS. 1 to 3, the injection device 4, 13, 20 can be arranged in each case in such a manner that the second fluid which can be introduced into the flow channel 12 by the injection device 4, 13, 20 optimally follows a swirl flow of the first fluid in the flow channel 12 of the compressor assembly 1 in order to reinforce the swirl flow of the first fluid.

In addition, in the embodiments of FIGS. 1 to 3, the fluid channel 13, 23 can form the contour for the nozzle.

LIST OF REFERENCE SIGNS 1 compressor assembly with diffuser
2 spiral housing of the compressor assembly (compressor outlet housing)
3 compressor outlet flange
4 injection device
5 diffuser
6 opening in the spiral housing
7 outer wall of the spiral housing
8 outer wall of the diffuser
9 filter sound absorber at the input of the compressor
10 bearing housing for the mounting of the shaft of the exhaust gas turbocharger
11 compressor outlet flange
12 flow channel
13 fluid channel of the injection device
14 connection element for supply of fluid
16 compressor outlet flange with connection piece
17 compressor outlet flange
18 connection piece
19 reservoir
20 injection device
23 fluid channel of the injection device
24 first opening of the injection device
25 second opening of the injection device
30 gas outlet housing of the turbine of the exhaust gas turbocharger
31 gas inlet housing of the turbine of the exhaust gas turbocharger

The invention claimed is:

1. A turbocharger for an internal combustion engine, the turbocharger comprising a compressor assembly, the compressor assembly comprising:
    a spiral housing having a flow channel defined therein, the flow channel designed to convey a first fluid which can be sucked up from outside the compressor assembly and to feed said first fluid to a compressor outlet, wherein the spiral housing comprises a conical diffuser,
    a compressor outlet flange arranged on the spiral housing adjacent to the conical diffuser, and
    an air injection device for improving the load response behavior of the internal combustion engine, wherein the injection device is configured to introduce air from outside the spiral housing into the flow channel, wherein the air injection device is arranged outside the flow channel of the spiral housing, and wherein the air injection device is arranged to inject the air into the conical diffuser.

2. The turbocharger as claimed in claim 1, wherein the air injection device is at least partially incorporated into the spiral housing, and wherein the injection device comprises at least one opening to the flow channel so that the air can be introduced from outside the compressor assembly into the flow channel by the injection device.

3. The turbocharger as claimed in claim 1, wherein the injection device comprises an air channel.

4. The turbocharger as claimed in claim 1, wherein the injection device is attached to an outer wall of the spiral housing so that the air can be introduced from outside the compressor assembly via the injection device into the flow channel through an opening in the spiral housing.

5. The turbocharger as claimed in claim 4, wherein the outer wall of the spiral housing, to which the injection device is attached, forms part of an outer wall of the conical diffuser.

6. The turbocharger as claimed in claim 1, wherein the compressor outlet flange at least partially comprises the injection device so that the air can be introduced from outside the compressor assembly by the injection device into the flow channel of the spiral housing.

7. The turbocharger as claimed in claim 6, wherein the injection device comprises an air channel in the compressor outlet flange, wherein the air channel comprises a first opening and a second opening, wherein the air can be introduced from outside the compressor assembly into the air channel via the first opening of the air channel, and wherein the second opening of the air channel fluidically connects the air channel to the flow channel of the spiral housing so that the air can be introduced into the flow channel.

8. The turbocharger as claimed in claim 7, wherein a portion of the air channel is formed by a connection piece which is connectable to the compressor outlet flange.

9. The turbocharger as claimed in claim 7, wherein the air injection device has a reservoir for storing the air and for the uniform distribution of the air over the circumference of the flow channel, wherein the reservoir comprises part of the air channel.

10. The turbocharger as claimed in claim 1, wherein the air injection device comprises a connection element arranged to introduce the air from outside the compressor assembly into the injection device via an injection element which is insertable into the connection element.

11. The turbocharger as claimed in claim 10, wherein the injection device is of nozzle-shaped design.

12. The turbocharger as claimed in claim 8, wherein the air injection device has a reservoir for storing the air and for the uniform distribution of the air over the circumference of the flow channel, wherein the reservoir comprises part of the air channel.

13. The turbocharger as claimed in claim 10, wherein the connection element is disposed at least partially within the housing.

14. A turbocharger for load responsiveness, the turbocharger comprising:
    a housing defining a flow channel for conveying a first fluid, a diffuser through which the flow channel passes, an outlet flange forming part of the housing at an end of the flow channel, and an air injection communication port arranged to introduce injection air as a second fluid into the flow channel within the diffuser, wherein the air injection communication port extends through a portion of the housing in communication with the flow channel within the diffuser, wherein the air injection communication port is arranged opened to outside of the turbocharger housing for receiving injection air from outside the housing.

15. The turbocharger as recited in claim 14, wherein the air injection communication port extends through an outer wall of an outlet flange of the housing, the outer wall being thicker than another outer wall of the housing defining a spiral portion of the flow channel.

16. A method of operation of a compressor assembly of a turbocharger for load responsiveness, the method comprising:

drawing a first fluid within a flow channel of a housing and into a diffuser through which the flow channel passes to an outlet flange forming part of the housing at an end of the flow channel, and injecting injection air through an air injection communication port arranged to introduce injection air as a second fluid into the flow channel within the diffuser, wherein the air injection communication port extends through a portion of the housing in communication with the flow channel within the diffuser for providing injection air from outside the housing.

* * * * *